(12) United States Patent
Chuang et al.

(10) Patent No.: US 7,525,228 B2
(45) Date of Patent: Apr. 28, 2009

(54) THREE-PHASE OPPOSITE ROTATING MOTOR AND FAN

(75) Inventors: Kun-Fu Chuang, Taoyuan Hsien (TW); Shun-Chen Chang, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 74 days.

(21) Appl. No.: 11/647,474

(22) Filed: Dec. 29, 2006

(65) Prior Publication Data

US 2007/0152536 A1 Jul. 5, 2007

(30) Foreign Application Priority Data

Jan. 3, 2006 (TW) ............................... 95100203 A

(51) Int. Cl.
*H02K 16/02* (2006.01)
(52) U.S. Cl. ........................ 310/112; 310/113; 310/114; 310/266; 310/268
(58) Field of Classification Search ................. 310/112, 310/114, 113, 266, 268
See application file for complete search history.

(56) References Cited

U.S. PATENT DOCUMENTS

| | | | | |
|---|---|---|---|---|
| 2,470,767 A | * | 5/1949 | Ellis ............................ 318/830 |
| 3,189,770 A | * | 6/1965 | Henry-Baudot ........ 310/156.37 |
| 4,295,783 A | * | 10/1981 | Lebost ........................ 415/4.4 |
| 4,358,693 A | * | 11/1982 | Palmer et al. .................. 310/46 |
| 4,567,462 A | * | 1/1986 | Leiby ........................... 341/13 |
| 4,691,192 A | * | 9/1987 | Baker ........................... 341/11 |
| 5,289,069 A | * | 2/1994 | Hasegawa et al. ....... 310/156.37 |
| 5,334,899 A | * | 8/1994 | Skybyk ....................... 310/268 |
| 5,514,923 A | * | 5/1996 | Gossler et al. ................. 310/74 |
| 5,677,585 A | * | 10/1997 | Ida et al. ........................ 310/91 |
| 5,739,613 A | * | 4/1998 | Bahn ........................... 310/166 |
| 5,945,766 A | * | 8/1999 | Kim et al. .................... 310/268 |
| 6,232,690 B1 | * | 5/2001 | Schmider ............... 310/156.37 |
| 6,455,969 B1 | * | 9/2002 | Chen .......................... 310/114 |
| 6,531,799 B1 | * | 3/2003 | Miller ......................... 310/114 |
| 2004/0119374 A1 | * | 6/2004 | Carl et al. .................... 310/268 |
| 2005/0110366 A1 | * | 5/2005 | Chang et al. ................. 310/268 |
| 2005/0140228 A1 | * | 6/2005 | Yeh et al. .................... 310/90.5 |
| 2005/0140244 A1 | * | 6/2005 | Yamada et al. .............. 310/268 |
| 2006/0038461 A1 | * | 2/2006 | Gabrys ........................ 310/266 |

* cited by examiner

*Primary Examiner*—Quyen P Leung
*Assistant Examiner*—Naishadh N Desai
(74) *Attorney, Agent, or Firm*—Birch, Stewart, Kolasch & Birch, LLP

(57) ABSTRACT

A three-phase opposite rotating motor of a fan comprises a stator having a three-phase coil set without a core, a first rotor and a second rotor. The number of the poles of the first rotor is unequal to the number of the poles of the second rotor. The ratio of the number of solenoids of the three-phase coil set and the number of the first poles of the first rotor is 3:4, and the ratio of the number of solenoids of the three-phase coil set and the number of the second poles of the second rotor is 3:2, to ensure the motor works normally in an opposite rotating operation.

18 Claims, 6 Drawing Sheets

THREE-PHASE OPPOSITE ROTATING MOTOR AND FAN

BACKGROUND OF THE INVENTION

1. Field of the Invention

The invention relates to an opposite rotating motor and an opposite rotating fan, and in particular to a three-phase opposite rotating motor having a single stator and two rotors and a three-phase opposite rotating fan having thereof.

2. Description of the Related Art

A conventional motor used in an axial fan comprises a single stator and a single rotor. To increase the output airflow or to prevent the primary fan from malfunctioning, it is essential that an auxiliary fan be disposed in series next to the primary fan. In fact, the primary and auxiliary fans are two independent fans, i.e. each fan has its own power supply system. However, these fans occupy a larger space and require a lengthy installation process, and the auxiliary fan increases the manufacturing cost. Further, it is possible that the resistance between the primary and auxiliary fans may be increased, so that the airflow cannot be efficiently raised because they are independent from each other. Thus, a motor with a single stator and two rotors is provided.

In FIG. 1, a motor M, a single-phase and core type motor, has a top rotor 11, a bottom rotor 12 and a middle stator 13 disposed between the top and bottom rotors 11, 12. A plurality of magnets serving as poles are circumferentially embedded in the top and bottom rotors 11, respectively. The number of magnets of the top rotor 11 is equal to that of the bottom rotor 12. The number of electrodes disposed in the middle stator 13 is equal to that of magnets of the top and bottom rotors 11, 12. Each electrode is formed by stacked thin silicon steel wound by exciting solenoids outwardly. The motor M has three Hall elements H1, H2 and H3 to detect a magnetic flux from the top rotor 11 so that the detected magnetic flux can be converted into a voltage signal to cause the middle rotor 13 to perform phase switching.

The electrodes and the Hall elements H1, H2 and H3, however, are difficult to install in and above the middle rotor 13, respectively. Furthermore, attractive force generated between the bottom rotors 11, the middle stator 13 and the bottom rotor 12 causes a large the ripple effect in rotation, resulting in a high start-up voltage and an unstable control of the magnetic declination. Thus, the rotational direction of the bottom rotors 11 can not rotate to be opposite the rotational direction of the bottom rotor 12, i.e., the top and bottom rotors 11 and 12 may rotate in the same direction.

BRIEF SUMMARY OF THE INVENTION

A three-phase opposite rotating motor of a fan comprises a stator having a three-phase coil set without a core, a first rotor and a second rotor. The number of the poles of the first rotor is unequal to that of the second rotor to ensure that the motor works normally in an opposite rotating operation.

In order to achieve the above objects, the stator of the invention comprises at least one three-phase coil set having three solenoids. When the motor is turned on, one solenoid of the three-phase coil set of the stator inducts the distribution of the line of magnetic force of the first and second rotors and generates an inversely electronkinetic potential in order to determine the direction of current of another solenoids, i.e., to determine the direction of excitation of the other solenoids. The excited solenoids together with the first and second rotors generate a magnetic effect to rotate the first and second rotors. In particular, the ratio of the number of solenoids of the three-phase coil set to that of the first poles of the first rotor is 3:4, and the ratio of the number of solenoids of the three-phase coil set to that of the second poles of the second rotor is 3:2, ensuring the motor works normally in an opposite rotating operation. Based on the ratio of the number of the first poles of the first rotor and that of the second poles of the second rotor is 2:1, the stator can be designed without silicon-steel or cores, and the first and second rotors are not attracted by each other, or attracted by the stator, thus eliminating the ripple effect in rotation. The first and second rotors can be independently rotated even if one of the first and second rotors malfunctions or is rendered motionless by other factors. Note that the invention uses one of the solenoids of the three-phase coil set to induce the pole of the first or second rotors instead of Hall element. Thus, the first and second rotors can be independently rotated even if one of the first and second rotors malfunctions or is rendered motionless by other factors. The rotational speed of the first and second rotors is controlled by the magnitudes of the first poles of the first rotor and the second poles of the second rotor as well as the gaps formed between the first rotor and the stator and between the second rotor and the stator.

A fan of the invention comprises the described motor, an outer frame having a base with a first surface and a second surface, a stator comprising a plurality of solenoids disposed in the base, a first rotor disposed on the first surface of the base and corresponding to the solenoids of the stator, a second rotor disposed on the second surface of the base corresponding to the solenoids of the stator, and a shaft disposed through the base for supporting the first and second rotors. The connecting portions can be ribs or stationary blades. The fan further comprises a controller disposed on the base or the outer frame and electrically connected to the stator. Different wind-shear loads can be constructed on the blades of the first rotor and the blades of the second rotor to control rotational speed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
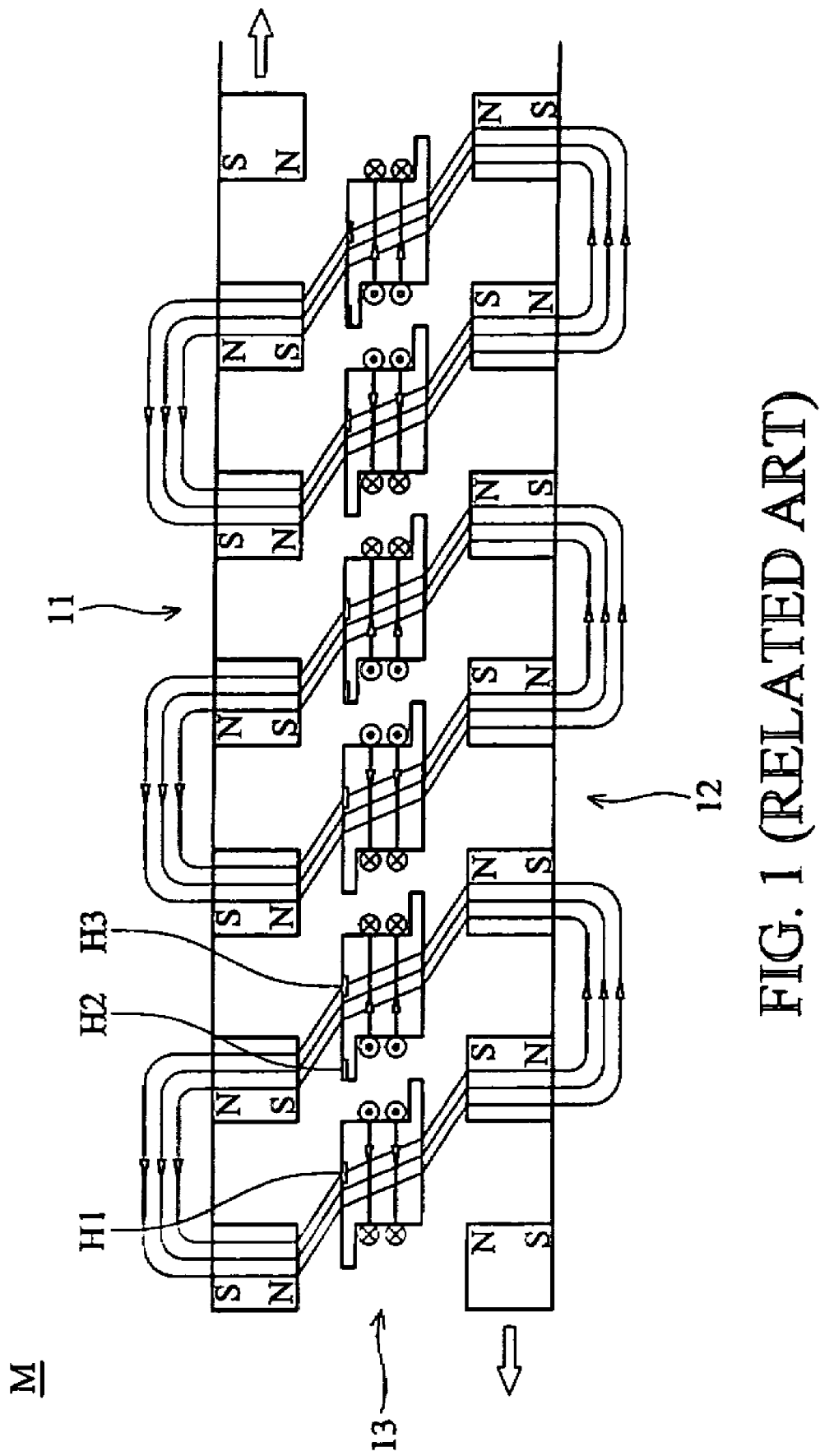
FIG. 1 is a schematic view of a conventional single-phase opposite rotating motor.
Figure 2:
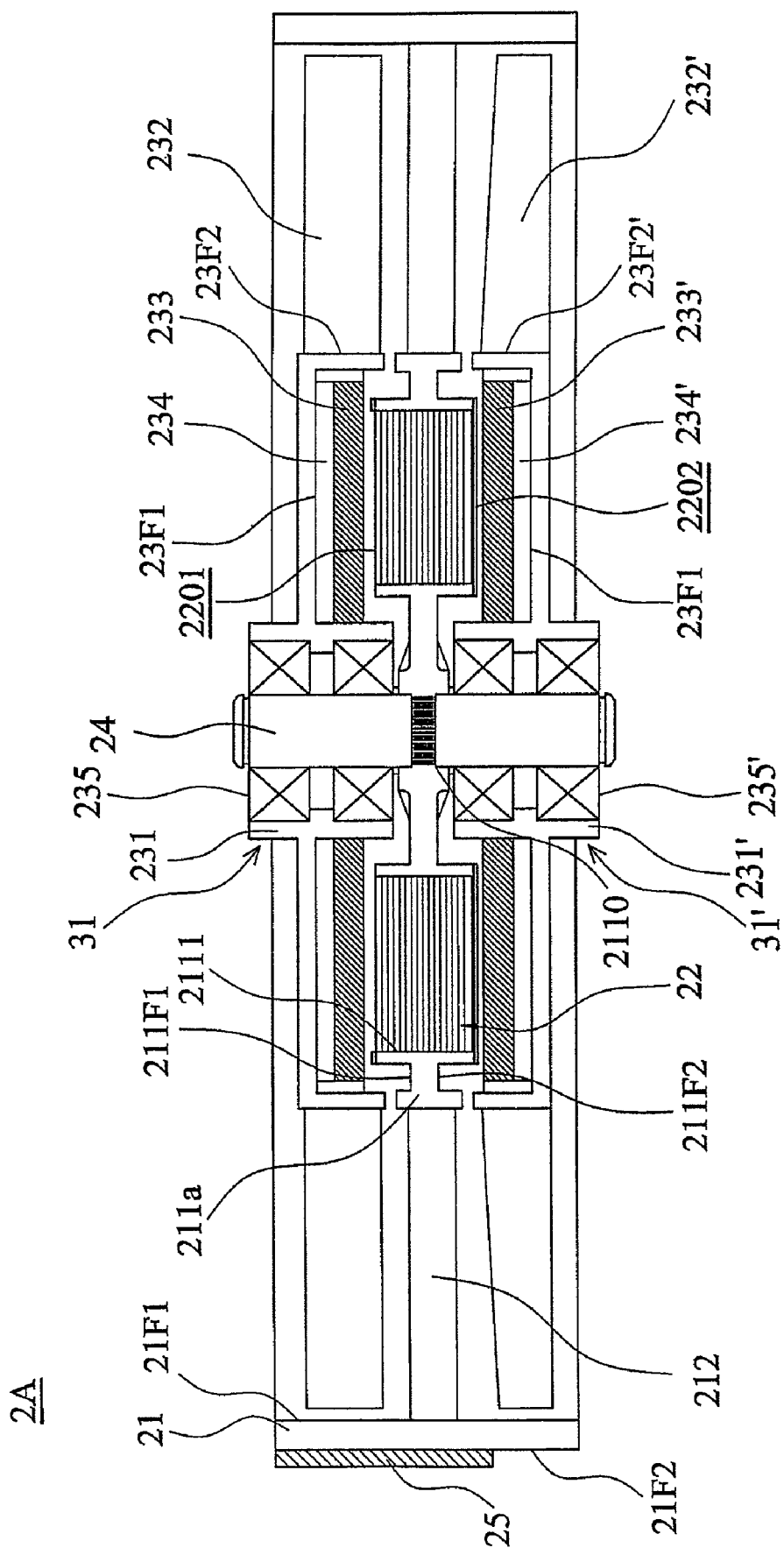
FIG. 2 is a longitudinally sectional view of a fan of a first embodiment of the invention.

In FIG. 2, a fan 2A of the first embodiment of the invention comprises an outer frame 21, a base 211a disposed in the outer frame 21, a plurality of connecting portions 212, a stator 22 comprising a first side 2201 and a second side 2202, a first rotor 31 disposed on the first side 2201 of the stator 22, a second rotor 31' disposed on the second side 2202 of the stator 22 and corresponding to the first rotor 31, a plurality of bearings 235 and 235', a shaft 24 and a controller 25. In this embodiment, the connecting portions 212, such as ribs or stationary blades, are securely disposed between the base 211a and the inner surface 21F1 of the outer frame 21. The base 211a comprises a first surface 211F1, a second surface 211F2, a centrally arranged through hole 2110 to telescope the shaft 24, and a plurality of hollow penetrating portions 2111 protruding from the first and second surfaces 211F1 and 211F2 to receive the stator 22 therein. The polarity of adjacent poles of the first rotor 31 is opposite to the polarity of adjacent poles of the second rotor 31'.

Figure 4A:
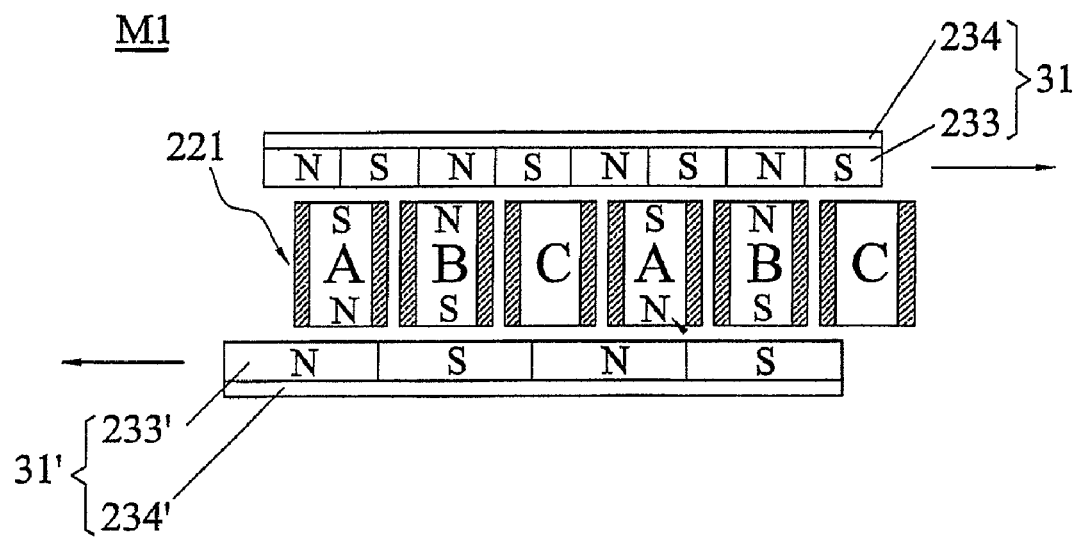
FIG. 4A is a schematic view of a three-phase opposite rotating motor of the invention.
Figure 4B:
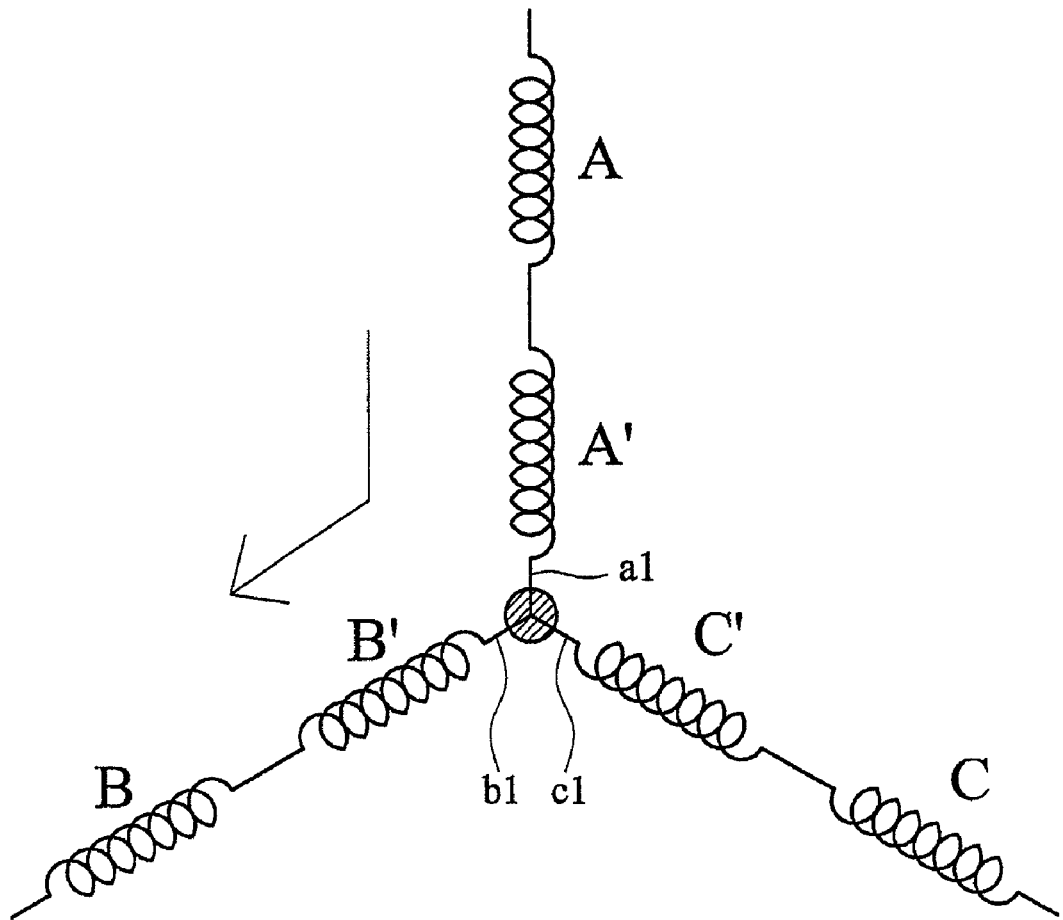
FIG. 4B is a schematic view of three-phase solenoids of FIG. 4A.

Referring also to FIG. 4A, the stator 22 of a motor M1 without any silicon steel sheet and comprises a three-phase coil set 221, the three-phase coil set 221 comprises three sets of solenoids "A, A'", "B, B'" and "C, C'" disposed in the hollow penetrating portions 2111 of the base 211a and corresponding to the first and second rotors 31 and 31' shown in FIG. 2. Referring to FIG. 4B, the solenoids "A, A'", "B, B'" and "C, C'" of the three-phase coil set 221 are electrically connected at one end a1, b1 and c1 thereof, respectively, to drive the first and second rotors 31, 31', and to excite and detect the distribution of the line of magnetic force of the first and second rotors 31, 31'.

The first rotor 31 comprises a hub 231, a plurality of blades 232 disposed around the periphery 23F2 of the hub 231, an iron sheet 234 disposed on an inner surface 23F1 of the hub 231, and a magnetic ring 233 disposed on the iron sheet 234. The second rotor 31' comprises a hub 231', a plurality of blades 232' disposed around the periphery 23F2' of the hub 231', a iron sheet 234' disposed on an inner surface 23F1' of the hub 231', and a magnetic ring 233' disposed on the iron sheet 234'. The number of the poles of the magnetic ring 233 of the first rotor 31 is unequal to that of the poles of the magnetic ring 233' of the second rotor 31'. As shown in FIG. 4A, the first rotor 31 has eight poles in a sequence of N, S, N, S, N, S, N and S, and the second rotor 31' has four poles in a sequence of N, S, N and S. The poles of the first and second rotors 31, 31' are polar alternately arranged, respectively. Different wind-shear loads can be constructed on the blades 232 of the first rotor 31 and the blades 232' of the second rotor 31' to control rotational speed.

Figure 3:
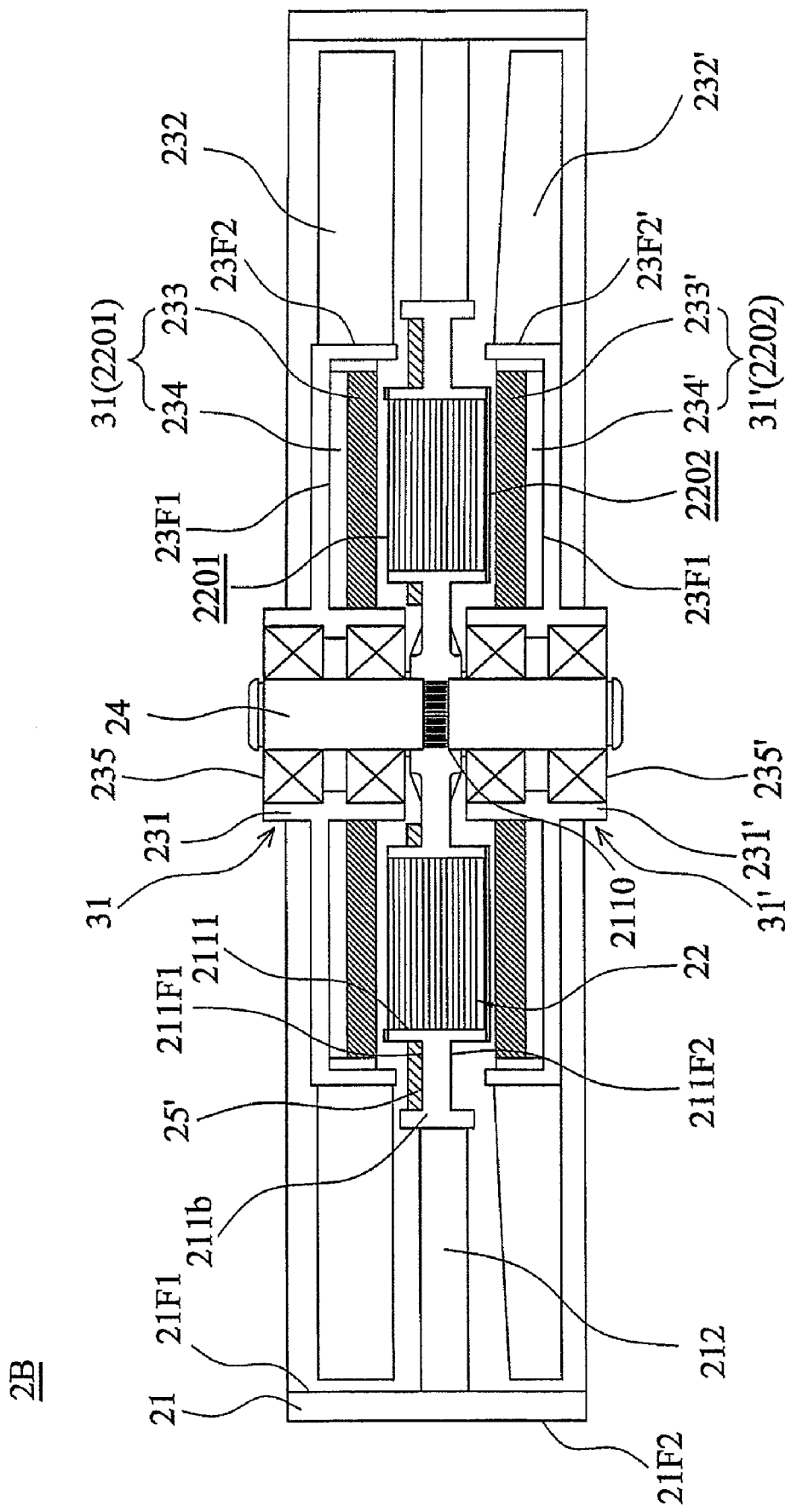
FIG. 3 is a longitudinally sectional view of a fan of a second embodiment of the invention.

The shaft 24 supported by the bearings 235 and 235' is disposed through the base 211a, and the first and second rotors 31, 31'. The controller 25, such as a printed circuit board (PCB), is disposed on the outer surface 21F1 of the outer frame 21 and electrically connected with the stator 22. Alternatively, as a fan 2B shown in FIG. 3, the controller 25' can be disposed on the base 211b. The difference between the fan 2B shown in FIG. 3 and the fan 2A shown in FIG. 2 is in that the controller 25 and 25' are disposed at different situations.

In FIG. 4A, the motor M1 comprises the first rotor 31 having the iron sheet 234 and the magnetic ring 233, the second rotor 31' having the iron sheet 234' and a magnetic ring 233', and the three-phase coil set 221.

First, when the motor M1 is turned on, the solenoids "C, C'" of the stator 22 induct the distribution of the line of magnetic force of the first and second rotors 31, 31' and form an inversely electronkinetic potential, to determine the direction of current of the other solenoids "A, A'" and "B, B'", i.e., to determine the direction of excitation of the solenoids "A, A'" and "B, B'" shown in FIG. 4B. One side of the first rotor 31 facing the solenoids "A, A'" forms the S-pole, and one side of the second rotor 31' facing the solenoids "A, A'" forms the N-pole. One side of the first rotor 31 facing the solenoids "B, B'" forms the N-pole, and one side of the second rotor 31' facing the solenoids "B, B'" forms the S-pole. The excited solenoids "B, B'" and "C, C'" together with the first and second rotors 31, 31' form the magnetic effect to rotate the first and second rotors 31, 31'.

Figure 5A:
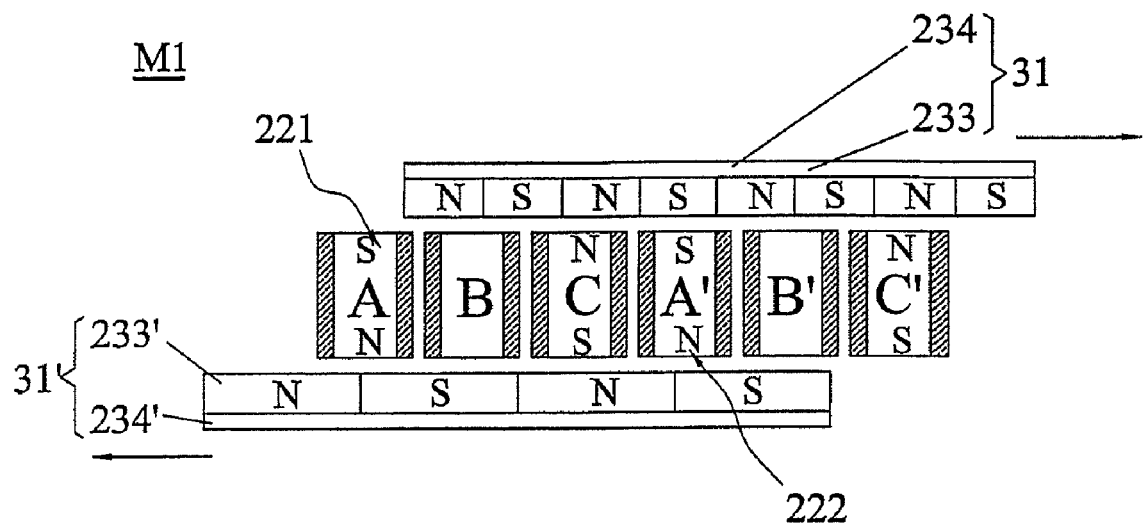
FIG. 5A is another schematic view of a three-phase opposite rotating motor of the invention.
Figure 5B:
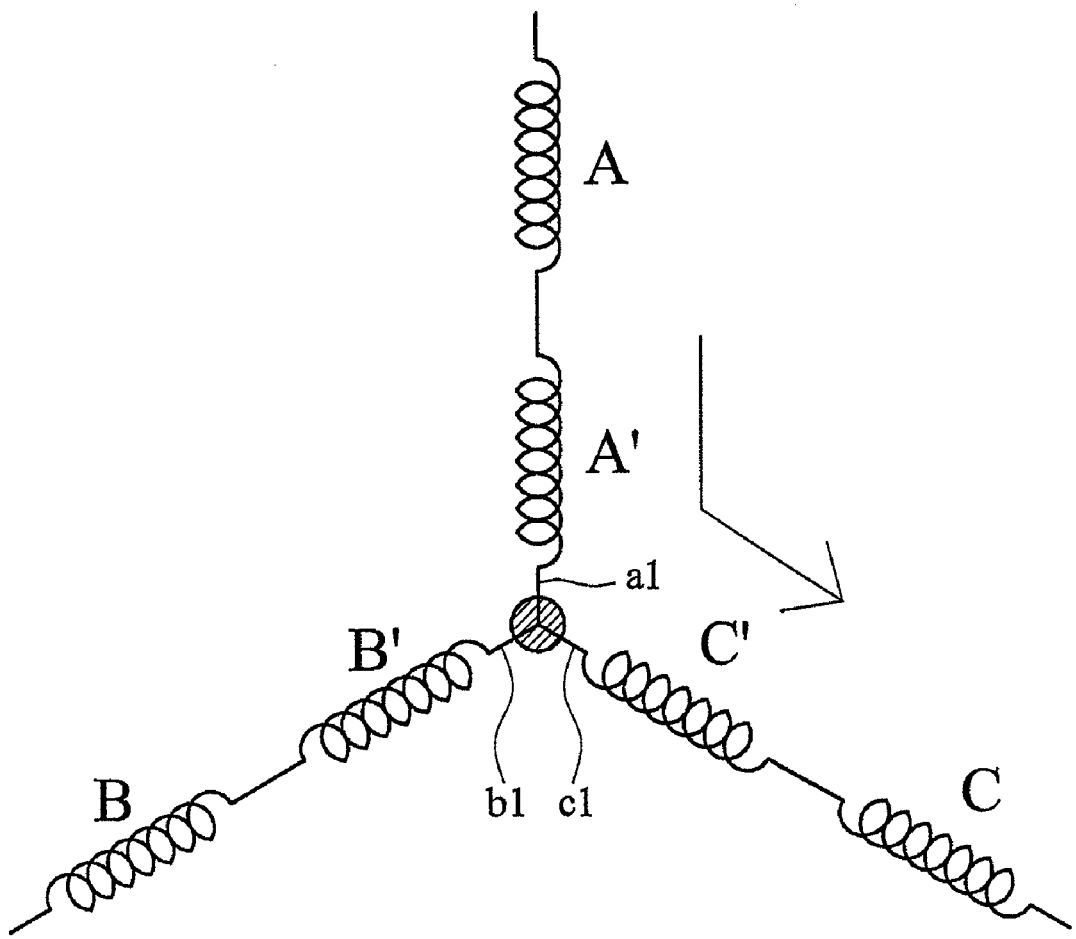
FIG. 5B is a schematic view of three-phase solenoids of FIG. 5A.

Secondly, in FIG. 5A, the solenoids "B, B'" of the stator 22 induct the distribution of the line of magnetic force of the first and second rotors 31, 31' and form an inversely electronkinetic potential, to determine the direction of current of the other solenoids "A, A'" and "C, C'". As shown in FIG. 5B, the solenoids "A, A'", "B, B'" and "C, C'" of the three-phase coil set 221 are electrically connected at one end a1, b1 and c1 thereof, respectively, to drive the first and second rotors 31, 31', and to excite and detect the distribution of the line of magnetic force of the first and second rotors 31, 31'. One side of the first rotor 31 facing the solenoids "A, A'" forms the S-pole, and one side of the second rotor 31 facing the solenoids "A, A'" forms the N-pole. One side of the first rotor 31 facing the solenoids "C, C'" forms the N-pole, and one side of the second rotor 31' facing the solenoids "C, C'" forms the S-pole. The excited solenoids "A, A'" and "C, C'" together with the first and second rotors 31, 31' form the magnetic effect to rotate the first and second rotors 31, 31'.

Third, the solenoids "A, A'" of three-phase coil set 221 of the stator 22 induct the distribution of the line of magnetic force of the first and second rotors 31, 31' and form an inversely electronkinetic potential, to determine the direction of current of the other solenoids "B, B'" and "C, C'". One side of the first rotor 31 facing the solenoids "B, B'" forms the S-pole, and one side of the second rotor 31' facing the solenoids "C, C'" forms the N-pole. One side of the first rotor 31 facing the solenoid "B, B'" forms the N-pole, and one side of the second rotor 31' facing the solenoid "C, C'" forms the S-pole. The excited solenoids "B, B'" and "C, C'" together with the first and second rotors 31, 31' form the magnetic effect to rotate the first and second rotors 31,31'.

The first and second rotors 31, 31' have different number of the poles, the ratio of the number of solenoids "A, A'", "B, B'" and "C, C'" of the three-phase coil set 221 to that of the first poles of the first rotor 31 is 3:4, and the ratio of the number of solenoids "A, A'", "B, B'" and "C, C'" of the three-phase coil set 221 to that of the second poles 233' of the second rotor 31' is 3:2. Thus, the first and second rotors 31, 31' normally rotate in opposite directions, respectively. Based on the ratio of the number of the first poles 233 of the first rotor 31 to that of the second poles 233' of the second rotor 31' is 2:1, the stator 22 is designed without silicon-steel or cores, and the first and second rotors 31, 31' are not attracted by each other or attracted by the stator 22 so that the ripple effect in rotation can be eliminated.

Figure 6:
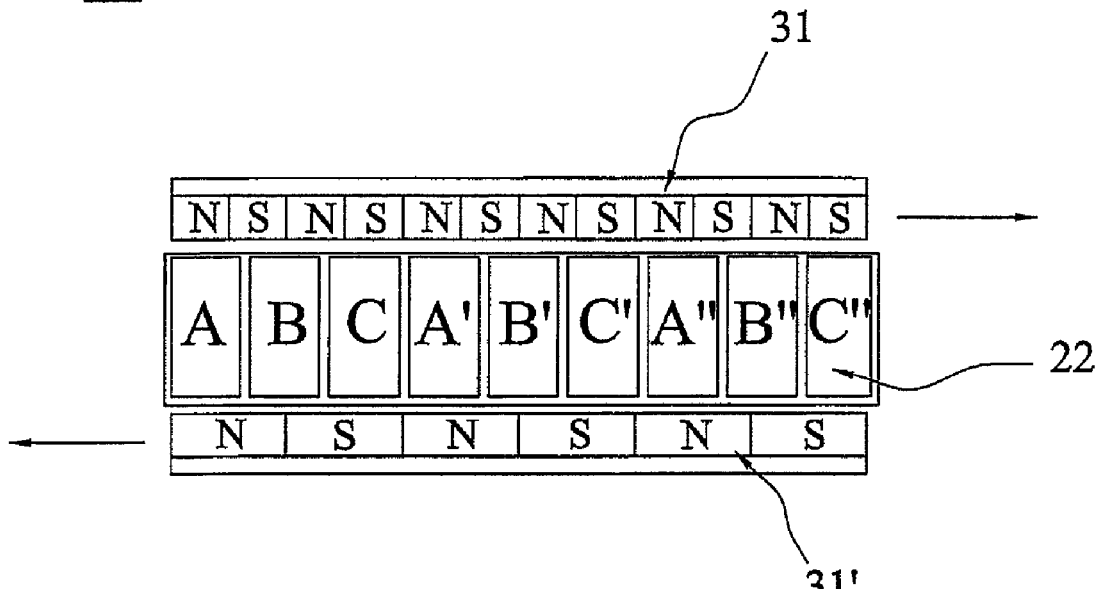
FIG. 6 is a schematic view of a three-phase opposite rotating motor of the invention.
Figure 7:
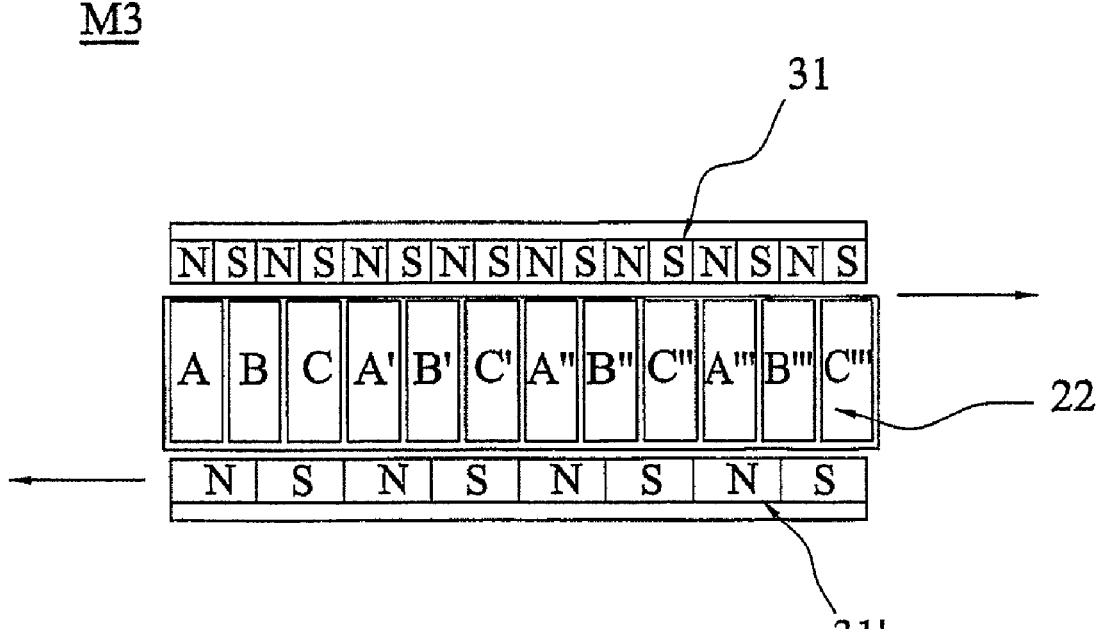
FIG. 7 is a schematic view of a three-phase opposite rotating motor of the invention.

In FIG. 6, in a motor M2, the number of the poles of the first rotor 31 can be twelve, that of the poles of the second rotor 31' can be six, and that of solenoids of the stator 22 can be nine, or that of the poles of the first rotor 31 is eight, that of the poles of the second rotor 31' is four, and that of solenoids of the stator 22 is six in the described embodiment. In FIG. 7, in a motor M3, the number of the poles of the first rotor 31 can be sixteen, that of the poles of the second rotor 31' can be eight, and that of solenoids of the stator 22 can be twelve. Note that the invention uses one of the solenoids of the three-phase coils 221 and 222 to induce the pole of the first or second rotors 31, 31' instead of Hall element. Thus, the first and second rotors 31, 31' can be independently rotated even if one of the first and second rotors 31, 31' malfunctions or is rendered motionless by other factors. If the first or second rotor 31, 31' malfunctions and stops, the other rotor driven by the solenoids of the three-phase coils 221 and 222 can still normally rotate. The rotational speed of the first and second rotors 31, 31' is controlled by the magnitudes of the first poles 233 of the first rotor 31 and the second poles 233' of the second rotor 31' as well as the gaps formed between the first rotor 31 and the stator 22 and between the second rotor 31' and the stator 22. In this embodiment, the gap formed between the first rotor 31 and the stator 22 is unequal to that formed between the second rotor 31' and the stator 22. The magnitude of the first poles 233 of the first rotor 31 can be equal or unequal to that of the second poles 233' of the second rotor 31'.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor, comprising:
   a stator, without cores or silicon steel sheets, comprising a first side and a second side;
   a first rotor disposed on the first side of the stator and the first rotor comprising a plurality of first poles; and
   a second rotor disposed on the second side of the stator, the second rotor corresponding to the first rotor and the second rotor comprising a plurality of second poles;
   wherein the stator comprises at least one three-phase coil set corresponding to the first and second rotors;
   wherein the number of the first poles of the first rotor is unequal to that of the second poles of the second rotor, and the first rotor, the stator and the second rotor are axially arranged.

2. The motor as claimed in claim 1, wherein the three-phase coil set comprises three sets of solenoids to excite and detect the distribution of the magnetic force line of the first and second rotors.

3. The motor as claimed in claim 2, wherein the solenoids of the three-phase coil set are connected at one end thereof, respectively.

4. The motor as claimed in claim 2, wherein the ratio of the number of solenoids of the three-phase coil set to that of the first poles of the first rotor is 3:4.

5. The motor as claimed in claim 2, wherein the ratio of the number of solenoids of the three-phase coil set to that of the second poles of the second rotor is 3:2.

6. The motor as claimed in claim 1, wherein the ratio of the number of the first poles of the first rotor and the number of the second poles of the second rotor is 2:1.

7. The motor as claimed in claim 1, wherein the polarity of adjacent poles of the first rotor is opposite to the polarity of adjacent poles of the second rotor.

8. The motor as claimed in claim 1, wherein the first and second rotors further comprises a iron sheet and a magnetic ring, and the magnetic ring forms the first and second poles, respectively.

9. The motor as claimed in claim 1, wherein a gap formed between the first rotor and the stator is equal to a gap formed between the second rotor and the stator.

10. The motor as claimed in claim 1, wherein a magnitude of the first poles of the first rotor is equal to that of the second poles of the second rotor.

11. A fan, comprising:
    a base;
    a stator, without cores or silicon steel sheets, comprising a plurality of solenoids disposed in the base;
    a first rotor disposed on one side of the base and corresponding to the solenoids of the stator, and the first rotor comprising a plurality of first poles;
    a second rotor disposed on the other side of the base, the second rotor corresponding to the solenoids of the stator and the second rotor comprising a plurality of second poles, wherein the number of the first poles of the first rotor is unequal to that of the second poles of the second rotor; and
    a shaft passing through the base for supporting the first and second rotors;
    wherein the solenoids of the stator form at least one three-phase coil set connected at one end thereof, respectively;
    wherein the first rotor, the stator and the second rotor are axially arranged with respect to the shaft.

12. The fan as claimed in claim 11, further comprising an outer frame, wherein the base is disposed in the outer frame and a plurality of ribs or stationary blades disposed between the base and the outer frame.

13. The fan as claimed in claim 12 further comprising a controller or circuit board, disposed on the base or the outer frame.

14. The fan as claimed in claim 11, wherein the first and second rotors respectively comprises a hub, a plurality of blades disposed around the hub, a iron sheet disposed on an inner surface of the hub, and a magnetic ring attached to the iron sheet.

15. The fan as claimed in claim 11, wherein the ratio of the number of the first poles of the first rotor to that of the second poles of the second rotor is 2:1.

16. The fan as claimed in claim 11, wherein the ratio of the number of solenoids of the stator to that of the first poles of the first rotor or to that of the second poles of the second rotor is 3:4.

17. The fan as claimed in claim 11, wherein the polarity of adjacent poles of the first rotor is opposite to that of adjacent poles of the second rotor.

18. The fan as claimed in claim 11, wherein the ratio of the number of solenoids of the stator and the number of the first poles or the second poles is 3:2, and the number of solenoids of the stator ranges between the number of the first poles of the first rotor and the number of the second poles of the second rotor.

* * * * *